G. TOWNSEND.
Apparatus for Distributing Poison on Plants, &c.
No. 212,412. Patented Feb. 18, 1879.
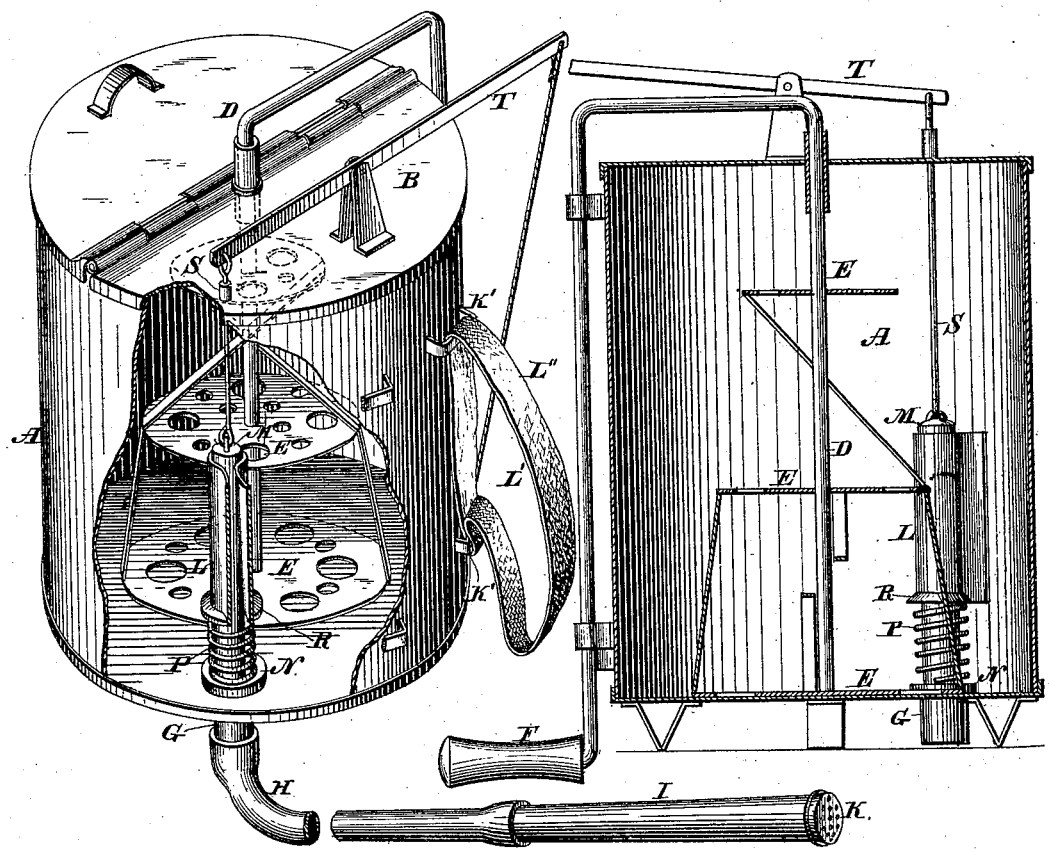
Attest.
J. Henry Kaiser.
J. A. Rutherford
Inventor:
George Townsend.
By James L. Norris,
Atty.

UNITED STATES PATENT OFFICE.

GEORGE TOWNSEND, OF GREENVILLE CENTRE, NEW YORK.

IMPROVEMENT IN APPARATUS FOR DISTRIBUTING POISON ON PLANTS, &c.

Specification forming part of Letters Patent No. 212,412, dated February 18, 1879; application filed July 17, 1878.

*To all whom it may concern:*

Be it known that I, GEORGE TOWNSEND, of Greenville Centre, in the county of Green and State of New York, have invented certain new and useful improvements in apparatus for distributing destructive agents over growing plants infested with the potato-bug or Colorado beetle, of which the following is a specification:

This invention has for its object to provide a convenient means for distributing destructive agents over growing plants infested with the potato-bug or Colorado beetle.

Paris-green has been found the most effective agent for the destruction of said insects; but, owing to its insolubility in water, it has been found necessary in order to apply it to employ it in the form of a dry powder, although it has been attempted to apply it in suspension in water by means of an ordinary flower-sprinkler.

The first-mentioned method of application has proved objectionable, owing to the poisonous nature of the article, which, when distributed in the form of powder, permeates the air, and is apt to be breathed by the person applying the same, and thus introduced into his system.

The second method of application has proved impracticable, owing to the fact that it is inconvenient to handle a flower-sprinkler containing a sufficient charge to perform any effective work, but principally to the fact that the paris-green is a heavy insoluble powder, which cannot be conveniently held in suspension in water, and soon settles from the same in an ordinary sprinkler, leaving the water comparatively pure and inefficacious for the desired purpose of destruction.

My invention is designed to furnish a means by which the paris-green may be kept in a uniform state of suspension in water and distributed in quantities as desired to the growing vegetation; and to this end the invention consists of a novel construction and combination of parts, which will be fully hereinafter described in detail, and pointed out in the claims, a preliminary explanation being, therefore, deemed unnecessary.

In the drawings, Figure 1 represents a perspective view of my improved apparatus, with a part broken away, showing the internal construction of the same. Fig. 2 represents a vertical sectional view of the apparatus, and Fig. 3 represents a modification of the improved jet-tube and valve.

The letter A represents a cylindrical or other shaped vessel, preferably constructed of sheet metal, and having a hinged cover, B, which may be elevated for charging said vessel, and afterward closed to protect the contents.

The letter D represents a vertical rod, extending through a central hollow sleeve secured to the top of the vessel, and adapted to reciprocate therein. The lower end of said rod is provided with a series of perforated agitating-disks, E, which are firmly secured thereto and move with it. The upper end of said rod is bent horizontally at right angles, and then vertically, extending downwardly, and terminating in a handle, F, within easy reach of the operator, upon whose back the apparatus is supported.

From the lower part of the apparatus extends a tube, G, to which is connected one end of a rubber hose, H, the other end of which is provided with a pipe, I, having a rose-sprinkler, K, at its end.

Immediately above the tube G, and adapted to reciprocate in a guide, L, secured to the interior of the vessel, is a reciprocating valve-rod, M, provided with a valve, N, on its lower end, which is adapted to open and close the mouth of the tube G. Said valve-rod is surrounded near its lower end with a spiral spring, P, the lower end of which bears against the valve N, and the upper end against a shoulder, R, on the lower end of the guide L, and keep the valve in its normal position seated upon the mouth of the pipe G, so as to prevent the escape of the contents of the vessel through the same. The upper end of the valve-rod, by means of a connection, S, passing through the top of the apparatus, is secured to one end of a lever, T, pivoted to a standard, U, secured to the said top. The other end of the lever is provided with a line or cord, extending below and within ready reach of an operator, by means of which the valve can be raised from its seat, in order to permit the liquid to escape into the discharge-tube, and from the jet-pipe attached to the same upon the infested vegetation.

In the modification shown in Fig. 3 the valve N and its operating mechanism are dispensed with, and the rose jet-pipe is provided with a similar valve, N, secured to the end of a lever, A', pivoted in a lug, B', at one side of said tube, and having a vertical rod pivoted to it, and extending into a barrel or cylinder, D', forming part of said jet-pipe, in which is located a spiral spring, E', which tends to keep the lever and its valve in a normal closed position upon the mouth of the jet-tube, so as to prevent the escape of the liquid therefrom. The opposite end of said lever has secured to it a line or cord, G', which extends through a guide, H', secured to the jet-tube, the end terminating in such position that the operator can conveniently operate the lever to shift the valve and open the end of the jet-tube, in order to discharge the liquid through the same.

The vessel A is provided with loops K', through which extend straps L', by means of which the vessel may be secured upon the back of the operator, leaving his hands free to operate the agitator and devices for discharging the liquid.

The operation of my apparatus is as follows: The vessel, after being charged with the paris-green and water, is strapped upon the back of the operator, and the contents are kept thoroughly agitated by means of the agitator, so as to keep the paris-green in a constant state of suspension.

As the liquid is required, it is discharged upon the vegetation by shifting the valve, so as to allow of the escape of the liquid through the jet-tube.

What I claim is—

1. The combination, with the vessel having the outlet-pipe G, of the valve N, rod M, guide L, and suitable valve-operating devices, extending outside of the vessel and within reach of the operator, substantially as described.

2. The combination, with the vessel A, having the outlet-pipe G, and guide L, having shoulder R, of the valve N, spring P, rod M, and the valve-operating lever and connecting-links, substantially as set forth.

3. In an apparatus for distributing poison on plants, &c., the combination of the following instrumentalities, to wit: a vessel, A, a series of perforated agitating-disks, E, all attached to a vertical rod, D, extending through the vessel, and terminating in a handle for operating the agitators, a discharge-tube provided with a rose-jet for the exit of the poison, and a spring-impelled self-closing valve for closing and opening the discharge-tube, all constructed and arranged to operate as herein shown and described.

In testimony that I claim the foregoing I have hereunto set my hand and seal in the presence of the subscribing witnesses.

GEORGE TOWNSEND. [L. S.]

Witnesses:
G. M. SANFORD,
W. H. McCABE.